(12) United States Patent
Tsai et al.

(10) Patent No.: US 8,816,289 B2
(45) Date of Patent: Aug. 26, 2014

(54) GAMMA DOSE RATE MEASUREMENT SYSTEM

(75) Inventors: Din Ping Tsai, Hsinchu (TW);
Chih-Chieh Wu, Hsinchu (TW);
Chih-Chung Chou, Hsinchu (TW);
Tai-Shan Liao, Hsinchu (TW);
Chi-Hung Huang, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 136 days.

(21) Appl. No.: 13/586,268

(22) Filed: Aug. 15, 2012

(65) Prior Publication Data

US 2013/0292576 A1    Nov. 7, 2013

(30) Foreign Application Priority Data

May 7, 2012    (TW) .............................. 101116252 A

(51) Int. Cl.
*G01T 1/02*    (2006.01)

(52) U.S. Cl.
USPC ..................................................... 250/370.07

(58) Field of Classification Search
USPC ..................................................... 250/370.07
See application file for complete search history.

(56) References Cited

U.S. PATENT DOCUMENTS

2009/0114830 A1 * 5/2009 Rubenstein .............. 250/370.08
2012/0292518 A1 * 11/2012 Goldstein .................... 250/362

FOREIGN PATENT DOCUMENTS

TW    100115017    4/2011

OTHER PUBLICATIONS

Machine Translation of TW201243378 Jan. 2014.*

* cited by examiner

*Primary Examiner* — David Porta
*Assistant Examiner* — Hugh H Maupin
(74) *Attorney, Agent, or Firm* — Muncy, Geissler, Olds & Lowe, P.C.

(57) ABSTRACT

The present invention discloses a gamma dose rate measurement system comprising a shielding device and an electronic device. The shielding device is arranged for masking a visible light, so that only a light source substantially being a gamma ray passes through the shielding device. The electronic device comprises a sensing module, an image analysis module and a display module. The sensing module generates a current signal after sensing the gamma ray; the image analysis module receives the current signal and generates an analysis result including a total gamma dose rate and a gamma energy spectrum; and the display module is arranged for displaying the analysis result.

6 Claims, 5 Drawing Sheets

GAMMA DOSE RATE MEASUREMENT SYSTEM

CROSS-REFERENCE TO RELATED APPLICATION

This application claims the benefit of Taiwan Patent Application No. 101116252, filed on May 7, 2012, in the Taiwan Intellectual Property Office, the disclosure of which is incorporated herein in its entirety by reference.

BACKGROUND OF THE INVENTION

1. Field of the Invention

The present invention relates to a measurement system, and more particularly to the field of gamma dose rate measurement systems.

2. Description of Related Art

In recent years, the nuclear safety issue becomes a public concern. Previously, nuclear plants were damaged seriously by tsunamis causing a catastrophic radiation leak in Japan. The leaked radioactive particles are α, β and γ particles of invisible lights, and excessive contact with these particles will cause harms to human body, and excessive exposures up to a certain level may even cause immediate life-threatening.

At present, the detection of the radiation particles requires dedicated instruments, and such instruments including Geiger counters and scintillation detectors generally come with relative large volume and high price. On the other hand, arm-badge thermal luminescence detection plate devices with a smaller volume are developed and introduced to the market. Although their use is convenient, yet it is necessary to check the dedicated instruments from time to time, and sometimes users cannot know whether the current radiation dose exceeds a safety value, so that the effect and application of these detectors are limited to follow-up records only.

As science and technology advance, pen-type or watch-type radiation dose meters are also developed and introduced in the market, so that users can carry the meter anytime to detect whether the radiation at a test location exceeds the safety value. However, the pen-type or other portable radiation dose meters require a battery for recharging the meter. In addition, such meters usually do not come with statistical and chart/table drawing functions.

In R.O.C. Pat. Application No. 100115017, an algorithm interface device used in a mobile device for detecting and evaluating the dose of invisible light particles was disclosed, wherein a common mobile device (such as a Smartphone) used in our daily life is applied to detect whether the level of radiation exceeds a safety value immediately, and a communication function is adopted to transmit the detected value of a test region to inform the general public, so that such invention can provide a more convenient way to carry and use the device. However, such invention requires an image sensor installed at the front of scintillation crystals and used for converting invisible light particles into a visible light, and then entering the visible light into the image sensor. Although this method can use a mobile device to detect the radiation, it is necessary to add scintillation crystals containing rare elements, and thus the cost is increased significantly. In addition, it is necessary to calibrate the device periodically, and thus the practicality is relatively low to the general public. Obviously, it is an urgent and important issue for related designers and manufacturers to provide a detection device that can use an image sensor of an electronic device to detect gamma rays directly and conveniently.

Therefore, the inventor of the present invention provides a gamma dose rate measurement system to overcome the drawbacks of the prior art.

SUMMARY OF THE INVENTION

In view of the aforementioned problems of the prior art, it is a primary objective of the invention to provide a gamma dose rate measurement system, comprising a shielding device and an electronic device. The shielding device can mask a visible light, so that only the light source substantially being a gamma ray can pass through the shielding device; the electronic device comprises a sensing module, an image analysis module and a display module. The sensing module can sense the gamma ray to generate a current signal; the image analysis module can receive the current signal and analyze the current signal to produce an analysis result including a total gamma dose rate and a gamma energy spectrum; and the display module can display the analysis result. Wherein, the shielding device is detachably coupled to the electronic device and installed on a light path where an external light source enters into the sensing module. and the light source of the sensing module is substantially the gamma ray.

Preferably, the shielding device is a columnar structure or a thin plate structure.

Preferably, the shielding device is made of an opaque metal material or an alloy thereof, an opaque non-metal material or a composite thereof or a combination of the opaque metal material and the opaque non-metal material.

Preferably, the sensing module is a complementary metal oxide semiconductor (CMOS) image sensor or a charge coupled device (CCD) image sensor.

Preferably, the image analysis module comprises a processor unit, a storage unit and a dose rate calculation unit, wherein the processor unit can analyze a current signal to produce a gamma-ray image and store the gamma-ray image into a storage unit; and the dose rate calculation unit can read the gamma-ray image to perform a dose rate calculation in order to obtain a total gamma dose rate and gamma energy spectrum.

Preferably, the dose rate calculation can be accomplished by using a noise filter module, a pixel brightness statistics module and a dose rate conversion module of the dose rate calculation unit; the noise filter module can perform a noise filtering of the gamma-ray image; the pixel brightness statistics module can perform a pixel brightness statistic according to the gamma-ray image after the noises are filtered; and the dose rate conversion module can perform a dose rate conversion of gamma-ray image processed by the pixel brightness statistic.

Preferably, the noise filtering can be accomplished by using a color recognition module and a pixel connected labeling module of the noise filter module; the color recognition module examines and determines whether the relation between the brightness value and a proportional parameter m of each pixel satisfies the condition $I_R \leq (I_G+1) \times m$ or $I_B \leq (I_G+1) \times m$, wherein $I_R$, $I_G$ and $I_B$ are the brightness values of red, green and blue pixels respectively, $1 \leq m \leq 2$; if the relation satisfies the condition described above, then the pixel will be considered as a first signal pixel, or else the pixel will be considered as a first noise pixel and the first noise pixel will be deleted; the pixel connected labeling module can assign a same label to the first signal pixels in the same connected region, and the first signal pixels with the same label are summed up to determine the size of the connected region. If the size of the connected region exceeds a predetermined size, then the pixel will be considered as a second signal pixel, or else the pixel will be considered as a second noise pixel and the second noise pixel will be deleted.

Preferably, the pixel brightness statistic can be accomplished by using a pixel brightness summation module and a pixel brightness histogram module of the pixel brightness statistics module; and the pixel brightness summation module can sum up a brightness value of each second signal pixel in the gamma-ray image to satisfy the following condition:

$$I_{TOT} = \sum_{i}^{M \times N} I_i$$

Wherein, $I_{TOT}$ is the total pixel brightness of the second signal pixel; M×N are the dimensions of the gamma-ray image; M and N are integers; and Ii is the brightness value; and the pixel brightness histogram module adds up the number of each brightness value by a one-dimensional function and calculates the statistics of a brightness distribution characteristic to produce a pixel brightness histogram, and the one-dimensional function satisfies the following condition:

$$F(k) = \sum_{i=1}^{k} I_i$$

Wherein, k is the number of classes of the brightness value, and this number falls within a range from 0 to 255.

Preferably, the dose rate conversion is accomplished by using the dose rate conversion module that converts the total pixel brightness $I_{TOT}$ into the actual measured total gamma dose rate through a calibration curve and converts the pixel brightness histogram into the actual received gamma energy spectrum through the calibration curve, and the calibration curve satisfies the following condition:

$$D = aI_{TOT} + b$$

Wherein, D is the total gamma dose rate, a and b are constants, a>0 and b≥0.

In summation, the gamma dose rate measurement system of the present invention does not require any additional scintillation crystal containing rare elements to detect radiations, and thus reducing the cost and improving the convenience of use significantly. Users of the electronic device do not require any additional power supply to measure the gamma dose rate and related information at a testing location, so as to broaden the scope of applicability and enhance the convenience of using the electronic device.

DETAILED DESCRIPTION OF THE PREFERRED EMBODIMENTS

The technical contents and characteristics of the present invention will become apparent with the detailed description of a preferred embodiment accompanied with related drawings as follows. For simplicity, same numerals are used in the following preferred embodiment to represent respective same elements.

Figure 1:
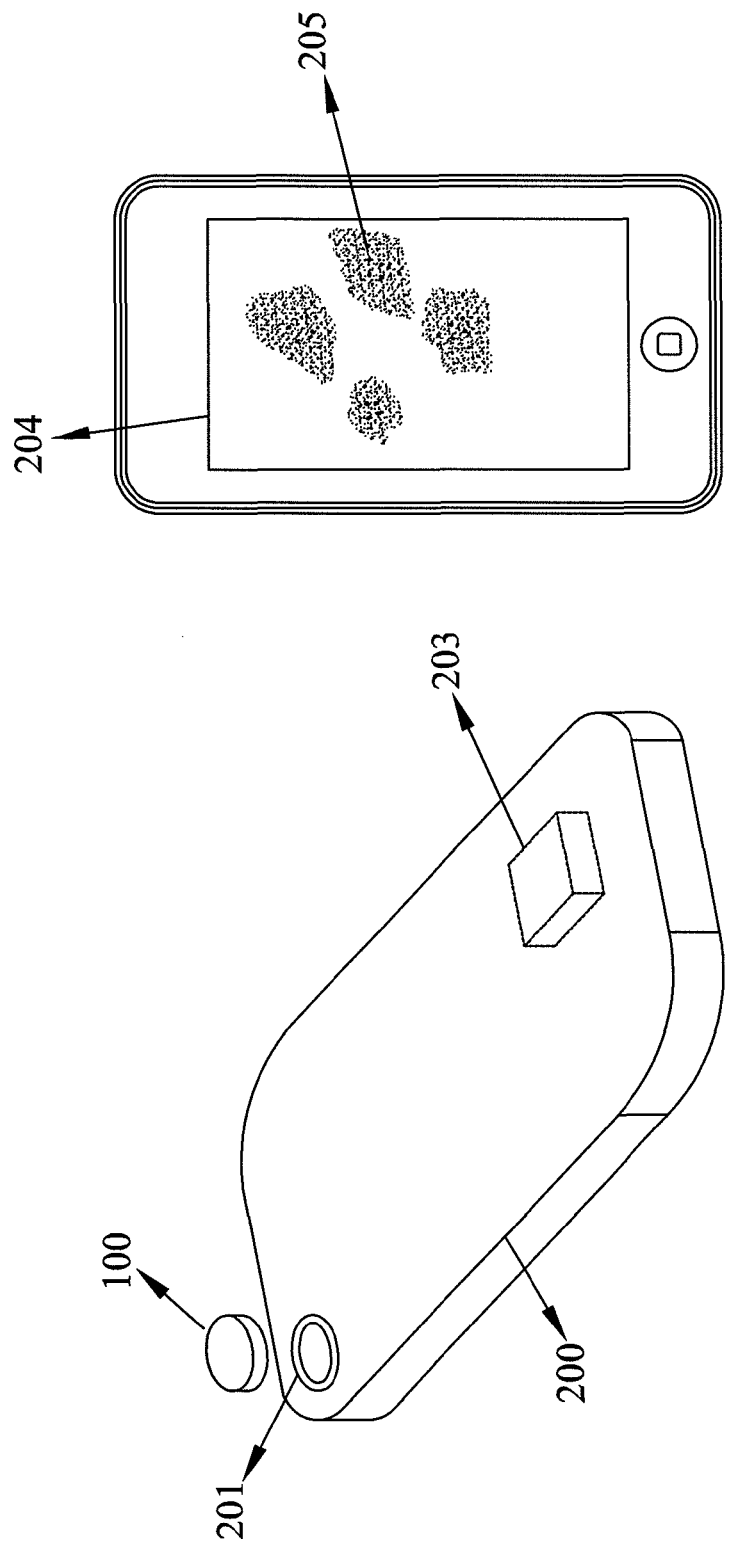
FIG. 1 is a schematic view of a gamma dose rate measurement system in accordance with the present invention.

With reference to FIG. 1 for a schematic view of a gamma dose rate measurement system in accordance with the present invention, the gamma dose rate measurement system comprises a shielding device 100 and an electronic device 200. The shielding device 100 can mask a visible light, so that only a light source substantially being a gamma ray can pass through the shielding device 100; the electronic device 200 comprises a sensing module 201, an image analysis module 203 and a display module 204. The sensing module 201 can sense the gamma ray to generate a current signal; the image analysis module 203 can receive the current signal and analyze the current signal to produce an analysis result including a total gamma dose rate and a gamma energy spectrum; and the display module can display the analysis result. Wherein, the shielding device 100 is detachably coupled to the electronic device 200 and installed on a light path where an external light source enters into the sensing module 201, so that only the light source substantially being a gamma ray can enter into the sensing module 201.

In addition, the shielding device 100 can be a columnar structure, a thin plate structure or a structure with any shape and capable of covering the sensing module 201. The shielding device 100 can be made of an opaque metal material or an alloy thereof, an opaque non-metal material or a composite thereof, or any combination of the above. In a preferred embodiment, the shielding device 100 can be made of an absorbing material, a latching material or a locking material (not shown in the figure) and capable of connecting or detaching the electronic device 200 easily without changing the original shape or appearance of the electronic device 200. On the other hand, the sensing module 201 includes but not limited to a complementary metal oxide semiconductor (CMOS) image sensor or a charge coupled device (CCD) image sensor. It is noteworthy that the electronic device 200 includes but not limited to a Smartphone, a tablet PC, a palmtop game player or a personal digital assistant.

In practice, users can connect the shielding device 100 to the electronic device 200 appropriately (such as installing the shielding device 100 on a light path where an external light source entering into the sensing module 201), so that the light source of the external environment will be masked by the shielding device 100, and only if the external environment has isotopes capable of radiating a decay gamma ray, the radiated gamma ray can pass through the shielding device 100 and enter into the sensing module 201. The sensing module 201 converts the detected gamma ray into a current signal, and the image analysis module 203 of the electronic device 200 receives the current signal for analysis, and displays the analysis result (such as a gamma-ray image 205) on the display module 204.

Figure 2:
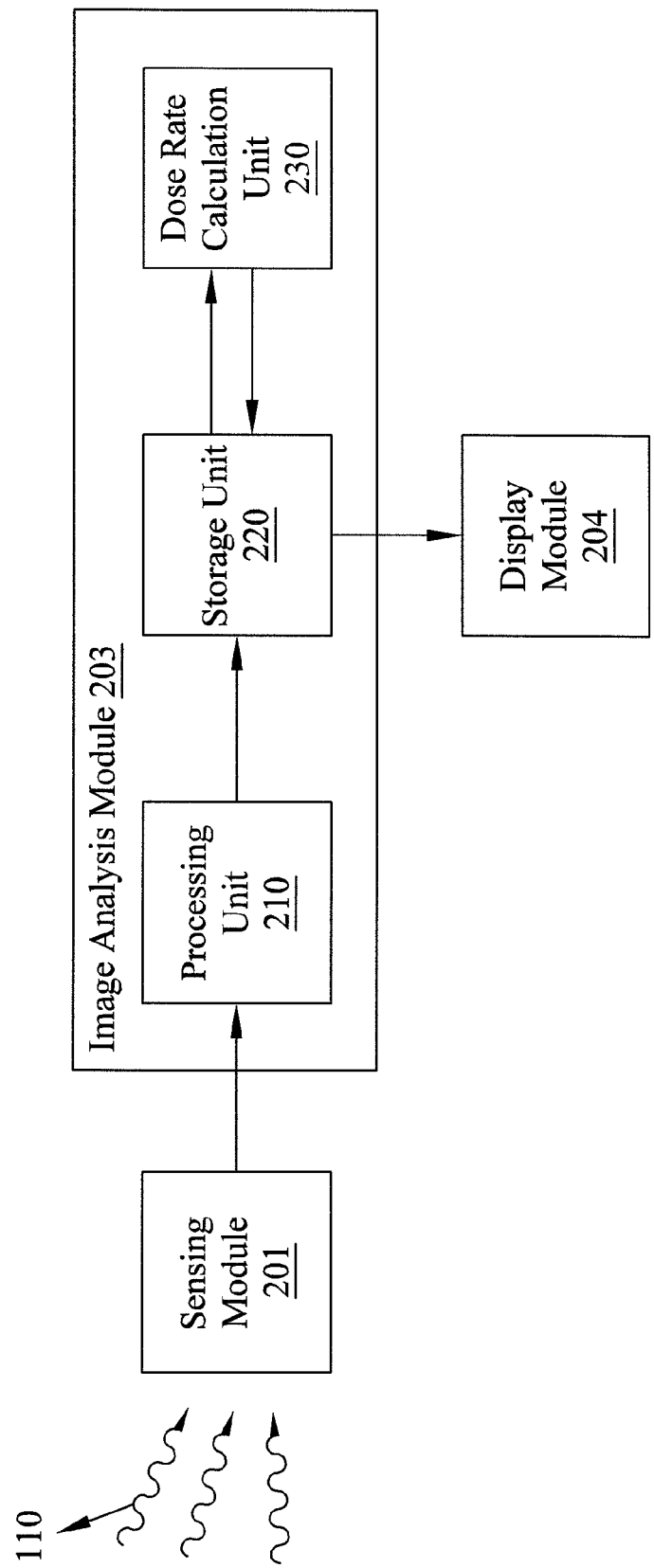
FIG. 2 is a block diagram of a gamma dose rate measurement system in accordance with the present invention.

With reference to FIG. 2 for a block diagram of a gamma dose rate measurement system in accordance with the present invention, after the gamma ray 110 from an external environment enters into the sensing module 201, the sensing module 201 converts the sensed gamma ray 110 into a current signal and then transmits the current signal to the image analysis module 203 for analysis. The image analysis module 203 comprises a processor unit 210, a storage unit 220 and a dose rate calculation unit 230. The processor unit 210 analyzes the current signal received by the sensing module 201 to produce a gamma-ray image and stores the gamma-ray image into the storage unit 220; the dose rate calculation unit 230 reads the gamma-ray image stored in the storage unit 220 and performs a dose rate calculation to obtain a total gamma dose rate and a gamma energy spectrum, and then stores the total gamma dose rate and the gamma energy spectrum into the storage unit 220, so that the display module 204 can display the analysis results. Wherein, the processor unit 210 can be a central processing unit, a microprocessor, an image processor, a numeric signal processor, or a logic processor; the storage unit 220 includes but not limited to a dynamic random access memory, a static random access memory, a programmable read only memory, an erasable programmable read only memory, an electrically erasable programmable read only memory or a flash memory.

It is noteworthy that a user can determine whether to perform fixed-interval detections or dynamic continuous detections according to the analysis results 204 displayed from the display module in this preferred embodiment. More specifically, the user can decide the time for the sensing module 201 to sense and samples a gamma ray 110 and immediately reflect the result of the gamma-ray image, the total gamma dose rate or the gamma energy spectrum to obtain more detailed statistical data.

Figure 3:
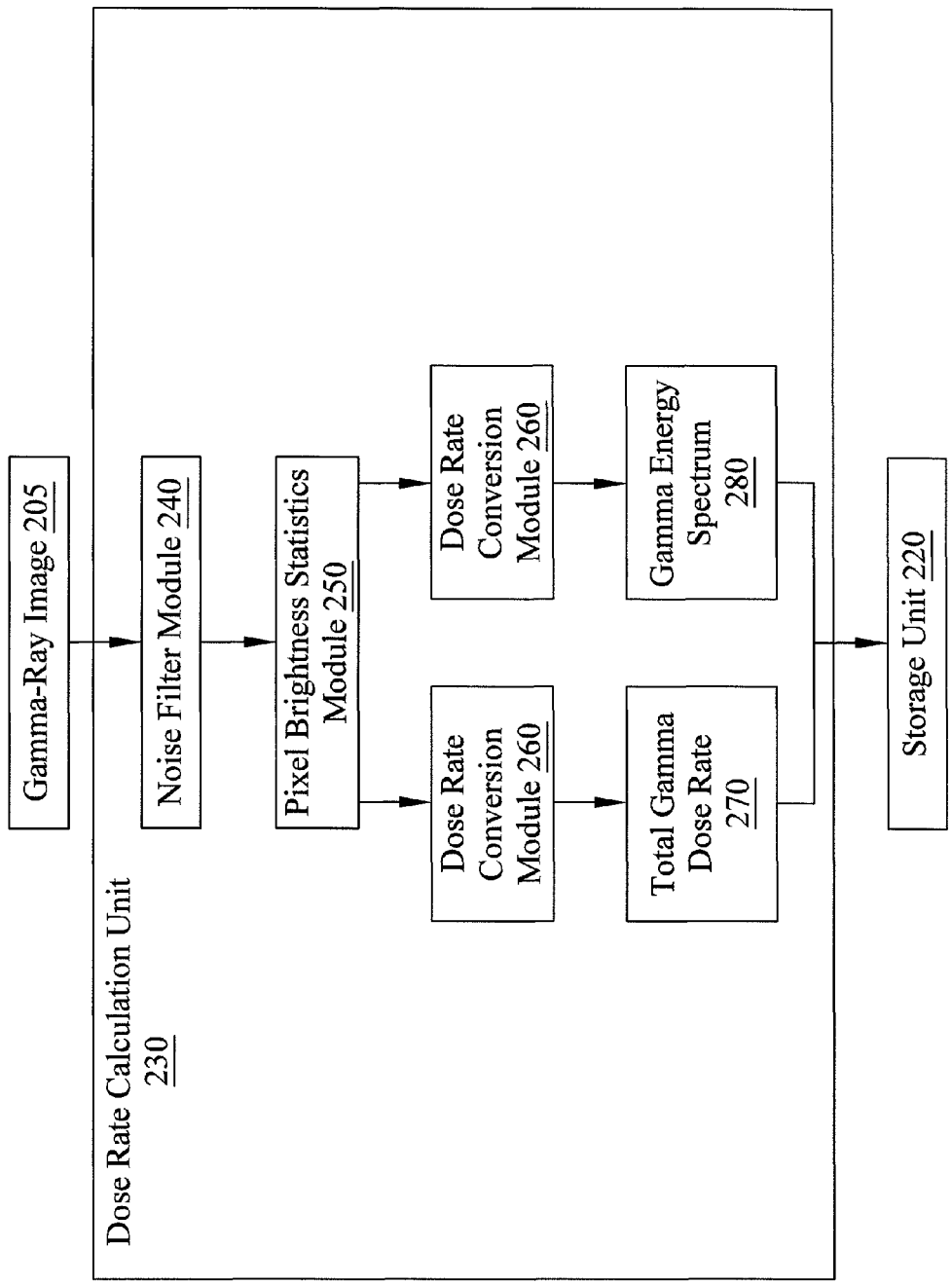
FIG. 3 is a block diagram of a dose rate calculation unit of a gamma dose rate measurement system in accordance with the present invention.
Figure 4:
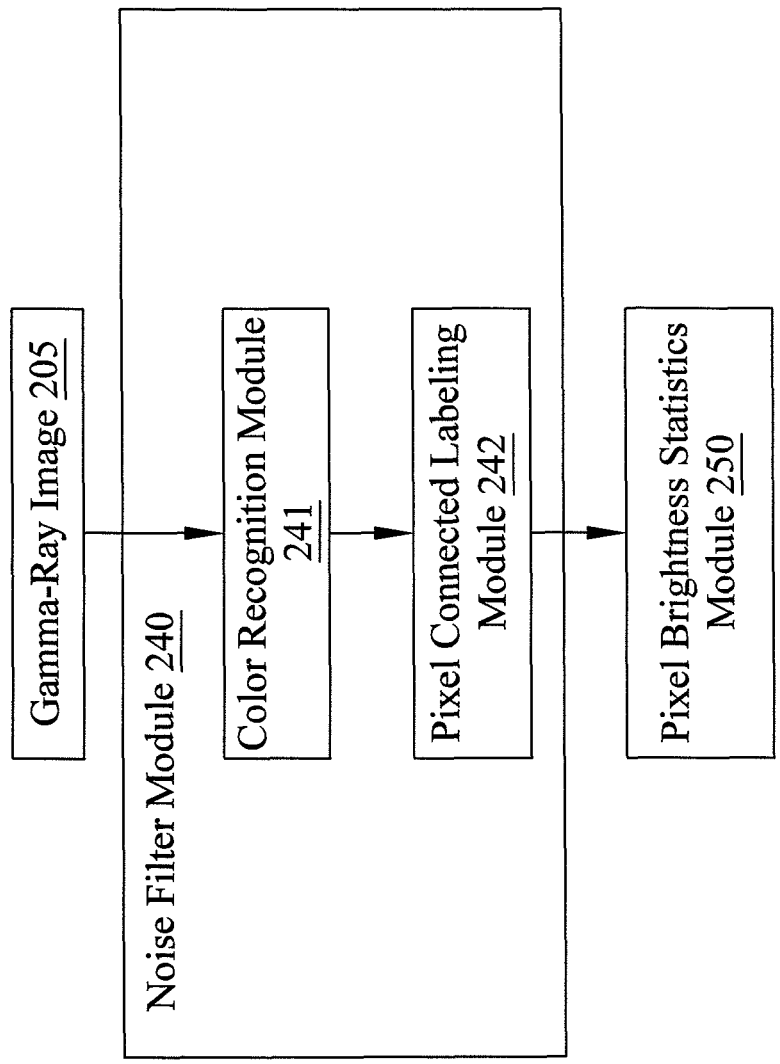
FIG. 4 is a block diagram of a noise filter module of a gamma dose rate measurement system in accordance with the present invention.
Figure 5:
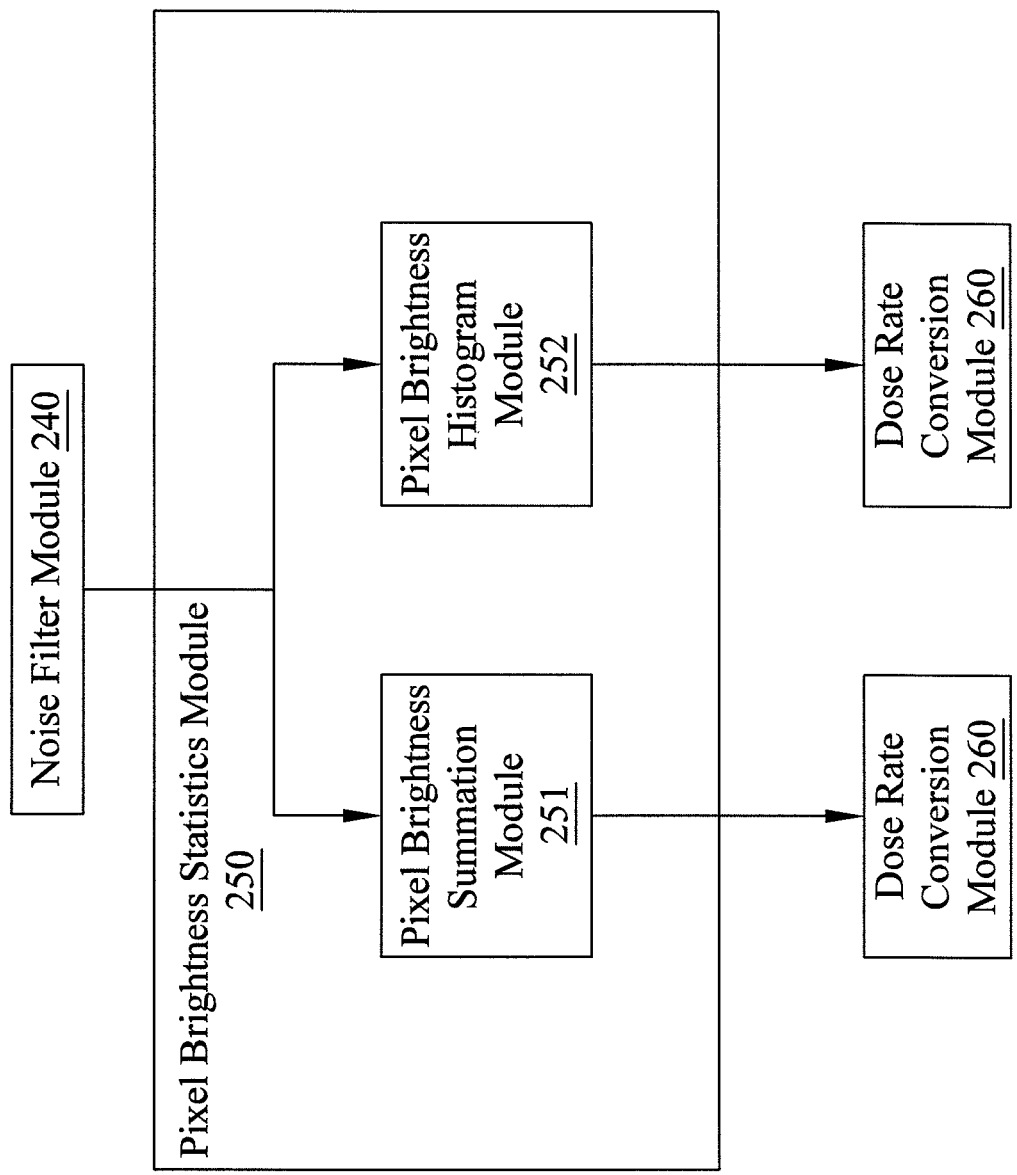
FIG. 5 is a block diagram of a pixel brightness statistics module of a gamma dose rate measurement system in accordance with the present invention.

With reference to FIGS. 3 to 5 for a block diagram of a gamma dose rate measurement system, a block diagram of a noise filter module of the gamma dose rate measurement system, and a block diagram of a pixel brightness statistics module of the gamma dose rate measurement system in accordance with the present invention respectively, a dose rate calculation of the gamma-ray image 205 (as shown in FIG. 3) can be performed by the dose rate calculation unit 230, wherein the dose rate calculation unit 230 comprises a noise filter module 240, a pixel brightness statistics module 250 and a dose rate conversion module 260; the noise filter module 240 performs a noise filter of the gamma-ray image 205 first, and then the brightness statistics module 250 calculates a pixel brightness statistic of the filtered gamma-ray image, and the dose rate conversion module 260 performs a dose rate conversion of the gamma-ray image after being processed by the pixel brightness statistic calculation to obtain a total gamma dose rate 270 and a gamma energy spectrum 280, and finally the total gamma dose rate 270 and the gamma energy spectrum 280 are stored into the storage unit 220.

Wherein, the noise filter can be accomplished by using a color recognition module 241 and a pixel connected labeling module 242 of the noise filter module 240 (as shown in FIG. 4). The color recognition module 241 examines and determines whether the relation between a pixel brightness value of the gamma-ray image 205 and a proportional parameter m satisfies the condition of $I_R \leq (I_G+1) \times m$ or $I_B \leq (I_G+1) \times M$, wherein, $I_R$, $I_G$ and $I_B$ are brightness values of red, green and blue pixels respectively, and $1 \leq m \leq 2$; if the relation satisfies the aforementioned condition, then the pixel will be considered as a first signal pixel, or else the pixel will be considered as a first noise pixel and the first noise pixel will be deleted. And then, the pixel connected labeling module 242 assigns a same label to the first signal pixels in a same connected region and the first signal pixels with the same label are summed up to determine the size of the connected region. If the size of the connected region exceeds a predetermined size, then the pixel will be considered as a second signal pixel, or else the pixel will be considered as a second noise pixel and the second noise pixel will be deleted, and the second signal pixel is transmitted to the pixel brightness statistics module 250.

Further, users can use a pixel brightness summation module 251 and a pixel brightness histogram module 252 of the pixel brightness statistics module 250 to calculate the statistics of the second signal pixels received by the noise filter module 240 (as shown in FIG. 5). Wherein, the pixel brightness summation module 251 sums up a brightness value of each of the second signal pixels in the gamma-ray image that satisfies the following condition:

$$I_{TOT} = \sum_{i}^{M \times N} I_i$$

Wherein, $I_{TOT}$ is the total pixel brightness of the second signal pixel, M×N are the dimensions of the gamma-ray image, M and N are integers, and $I_i$ is the brightness value. The pixel brightness histogram module 252 can add the number of the brightness values by a one-dimensional function and calculate the statistic of a rightness distribution characteristic to produce a pixel brightness histogram, and the one-dimensional function satisfies the following condition:

$$F(k) = \sum_{i=1}^{k} I_i$$

Wherein, k is the number of classes of the brightness values, and this number falls within a range from 0 to 255.

In other words, after the total pixel brightness is calculated by the pixel brightness summation module 251 and the pixel brightness histogram is calculated by the pixel brightness histogram module 252, the total pixel brightness and the pixel brightness histogram are transmitted to the dose rate conversion module 260 to perform a dose rate conversion.

In the dose rate conversion, the dose rate conversion module 260 is used to convert the total pixel brightness $I_{TOT}$ into the actual measured total gamma dose rate 270 through a calibration curve, or the dose rate conversion module 260 converts the pixel brightness histogram into the actual received gamma energy spectrum 280 through the calibration curve, and the calibration curve satisfies the following condition:

$$D = aI_{TOT} + b$$

Wherein, D is the total gamma dose rate, a and b are constants, a>0, and b≥0.

In summation of the description above, the gamma dose rate measurement system of the present invention integrates a removable shielding device with the image processing technology of the electronic device and uses an image sensor of a portable electronic device to replace the conventional radiation detector. In addition, the gamma dose rate measurement system of the invention can obtain the gamma-ray image, the total gamma dose rate and the gamma energy spectrum at the same time without requiring any additional power supply or scintillation crystal. or affecting the original functions of the electronic device.

The gamma dose rate measurement system of the present invention further overcomes the problems of the conventional radiation detection instrument having the disadvantages of an expensive price, a large volume and a high maintenance cost. The gamma dose rate measurement system of the present invention has the advantage of an easy operation without requiring special training, so that users can know about the radiation dose of a testing object or a testing region immediately through image processing, so as to enhance the convenience and user-friendliness of the radiation detection significantly.

What is claimed is:

1. A gamma dose rate measurement system, comprising:
   a shielding device, arranged for masking a visible light, such that only a light source substantially being a gamma ray passes through the shielding device; and
   an electronic device, comprising:
   a sensing module, arranged for sensing the gamma ray to generate a current signal;
   an image analysis module, arranged for receiving the current signal, and analyzing the current signal to produce an analysis result including a total gamma dose rate and a gamma energy spectrum; and
   a display module, arranged for displaying the analysis result;
   wherein the shielding device is detachably coupled to the electronic device and installed on a light path where an external light source enters into the sensing module, so that the light source entering the sensing module is substantially the gamma ray;
   wherein the image analysis module comprises a processor unit, a storage unit and a dose rate calculation unit; the processor unit analyzes the current signal to generate a gamma-ray image and stores the gamma-ray image into the storage unit; the dose rate calculation unit reads the gamma-ray image and performs a dose rate calculation to obtain the total gamma dose rate and the gamma energy spectrum;
   wherein the dose rate calculation is accomplished by using a noise filter module, a pixel brightness statistics module and a dose rate conversion module of the dose rate calculation unit; the noise filter module performs a noise filtering of the gamma-ray image; the pixel brightness statistics module performs a pixel brightness statistic according to the gamma-ray image after being processing the noise filtering; and the dose rate conversion module performs a dose rate conversion of the gamma-ray image after being processing the pixel brightness statistic;
   wherein the noise filtering is accomplished by using a color recognition module and a pixel connected labeling module of the noise filter module; the color recognition module examines and determines whether the relation between a brightness value and a proportional parameter m of each pixel satisfies a condition of $I_R \leq (I_G+1) \times m$ or $I_B \leq (I_G+1) \times m$; wherein, $I_R$, $I_G$ and $I_B$ are the brightness values of red, green and blue pixels respectively, and $1 \leq m \leq 2$; if the relation satisfies the condition, then the pixel is considered as a first signal pixel, or else the pixel is considered as a first noise pixel and the first noise pixel is then deleted; and the pixel connected labeling module assigns a same label to the first signal pixels in a same connected region, and then the first signal pixels having the same label are summed up to determine the size of the connected region, and if size of the connected region exceeds a predetermined size, then the pixel is considered as a second signal pixel, or else the pixel is considered as a second noise pixel and the second noise pixel is then deleted.

2. The gamma dose rate measurement system of claim 1, wherein the shielding device is a columnar structure or a thin plate structure.

3. The gamma dose rate measurement system of claim 1, wherein the shielding device is made of an opaque metal material or an alloy thereof, an opaque non-metal material or a composite thereof or a combination of the opaque metal material and the opaque non-metal material.

4. The gamma dose rate measurement system of claim 1, wherein the sensing module is a complementary metal oxide semiconductor (CMOS) image sensor or a charge coupled device (CCD) image sensor.

5. The gamma dose rate measurement system of claim 1, wherein the pixel brightness statistic is accomplished by using a pixel brightness summation module and a pixel brightness histogram module of the pixel brightness statistics module; the pixel brightness summation module sums up the brightness value of each of the second signal pixels in the gamma-ray image to satisfy the condition of:

$$I_{TOT} = \sum_{i}^{M \times N} I_i$$

wherein, ITOT is a total pixel brightness of the second signal pixel, M×N is dimension of the gamma-ray image, M and N are integers, and Ii is the brightness value;

the pixel brightness histogram module adds up the number of each of the brightness values by a one-dimensional function and calculates the statistic of a brightness distribution characteristic to produce a pixel brightness histogram, and the one-dimensional function satisfies the condition of:

$$F(k) = \sum_{i=1}^{k} I_i$$

Wherein, k is number of classes of the brightness value, and the number falls within a range from 0 to 255.

6. The gamma dose rate measurement system of claim 1, wherein the dose rate conversion is accomplished by using the dose rate conversion module to convert the total pixel brightness ITOT into the actual measured of the total gamma dose rate through a calibration curve and to convert the pixel brightness histogram into the actual received of the gamma energy spectrum through the calibration curve; and the calibration curve satisfies the condition of:

$$D = aI_{TOT} + b$$

wherein, D is the total gamma dose rate, a and b are constants, a>0, and b≥0.

* * * * *